United States Patent [19]
Kondo

[11] 4,072,965
[45] Feb. 7, 1978

[54] ELECTRONIC SHUTTER CONTROL CIRCUIT

[75] Inventor: Toshihiro Kondo, Chofu, Japan

[73] Assignee: Fuji Photo Film Co., Ltd., Minami-ashigara, Japan

[21] Appl. No.: 666,614

[22] Filed: Mar. 15, 1976

[30] Foreign Application Priority Data

Mar. 19, 1975 Japan .................................. 50-33195

[51] Int. Cl.$^2$ ........................... G03B 7/08; G03B 9/08
[52] U.S. Cl. ......................................... 354/51; 320/1; 354/234
[58] Field of Search .................... 307/110; 315/241 P; 320/1; 354/238, 51, 234, 235

[56] References Cited

U.S. PATENT DOCUMENTS

| | | | |
|---|---|---|---|
| 3,248,633 | 4/1966 | Guarrera | 320/1 |
| 3,275,884 | 9/1966 | Segall et al. | 320/1 X |
| 3,805,143 | 4/1974 | Tavern et al. | 320/1 X |
| 3,831,079 | 8/1974 | Iwata | 320/1 X |

Primary Examiner—Stuart N. Hecker
Attorney, Agent, or Firm—Gerald J. Ferguson, Jr.; Joseph J. Baker

[57] ABSTRACT

An oscillator is connected with a DC power source for generating an oscillating output current. A plurality of capacitors are connected with the oscillator by way of diodes and are charged by the output current from the oscillator. The connecting point between each capacitor and its associated diode is connected via a switching circuit to an electromagnetic coil. For instance, one capacitor is connected with a coil for driving a leading shutter blind and another capacitor is connected with a coil for driving a trailing shutter blind.

6 Claims, 3 Drawing Figures

ELECTRONIC SHUTTER CONTROL CIRCUIT

BACKGROUND OF THE INVENTION

1. Field of the Invention

This invention relates to a power circuit for a photographic camera, and more particularly to a power circuit for supplying electric current to an electromagnetically driven shutter or diaphragm in a photographic camera.

2. Description of the Prior Art

It has been desired to reduce the number of parts of a camera to reduce the weight and size thereof. By simplifying the structure of the camera, it is also possible to simplify the operation and lower the manufacturing cost thereof. From the viewpoint of simplification, it is undesirable to drive the various mechanisms in the camera only by mechanical driving means. Therefore, as a means for controlling the shutter mechanism and the diaphragm mechanism there has been proposed and put into practice an electric control means employing an exposure control circuit.

Even in these electrically controlled cameras, however, the control mechanisms are driven by a mechanical force as of a spring. For instance, a spring force is charged by an operation to set a shutter mechanism and locked by a lock member, and then, the lock member is released by means of a solenoid or the like which is controlled by an electric circuit. The shutter mechanism is then driven by the force of the charged spring. These cameras employing a spring force to drive the shutter mechanism or the like require a complicated mechanical driving means. Therefore, the structure and operation of these cameras are still complicated and accordingly the manufacturing cost is still high.

In view of the defects inherent in these cameras, it has been proposed to drive the shutter mechanism or diaphragm mechanism by an electromagnetic force by use of a combination of a permanent magnet and a coil. However, since the driving force of the coil depends upon the number of turns of the windings and the amount of electric current flowing therethrough, the number of turns must be increased to obtain a large driving force with cells which, being small enough to load in the limited space within the camera body, are necessarily of low power. An increase in the number of turns of the coil windings results in an increase in the size of the coil, which is undesirable from the viewpoint of manufacture.

SUMMARY OF THE INVENTION

The primary object of the present invention is to provide an electric power supply circuit which is capable of supplying a large current with cells of low power.

Another object of the present invention is to provide an electric power supply circuit which is capable of driving an electromagnetically driven shutter or diaphragm within the camera body with a large driving force.

Still another object of the present invention is to provide an electric power supply circuit which is capable of driving an electromagnetically driven shutter or diaphragm at a high speed and with high response.

A further object of the present invention is to provide an electric power supply circuit which allows the mechanism of the camera to be simplified by reducing the number of parts used therein.

A still further object of the present invention is to provide an electric power supply circuit which lowers the cost of manufacture of the camera.

The above objects are accomplished by employing an oscillator and capacitors connected therewith in the camera. The oscillator is connected with a D.C. source and the output of the oscillator is stepped up by a transformer. The stepped up output of the oscillator is used to charge a plurality of capacitors connected in parallel by way of diodes. Each capacitor is connected with a set of output terminals with which an electromagnetic coil is to be connected by way of a switch whereby it is discharged through the coil in a short period when the switch is closed. The diode connected with each capacitor serves to prevent the capacitor from being discharged through the closed switch connected with another capacitor.

DESCRIPTION OF THE PREFERRED EMBODIMENT

Figure 1:
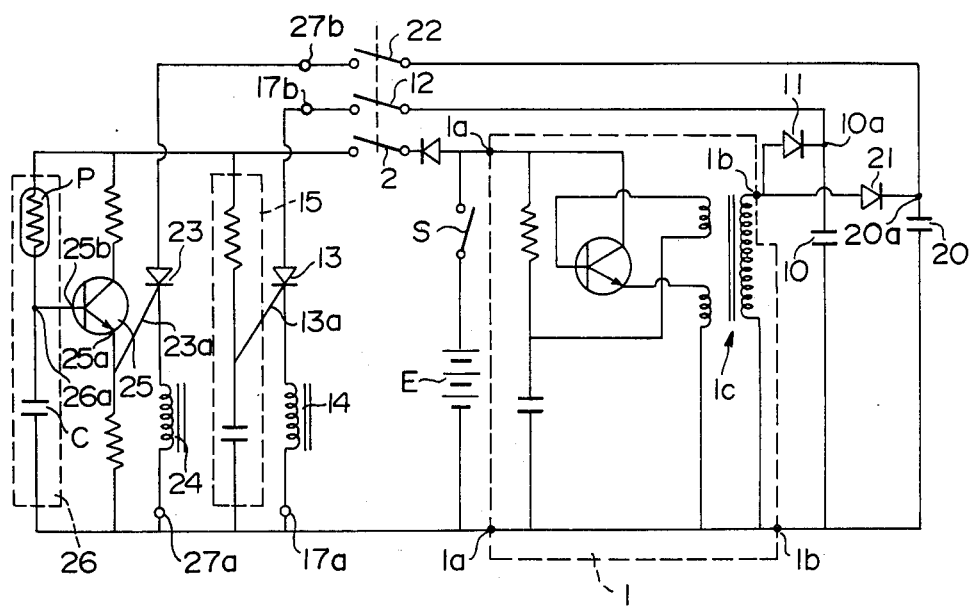
FIG. 1 is a circuit view showing an embodiment of the power supply circuit in accordance with the present invention.

FIG. 1 shows an embodiment of the invention which is applied to an electric shutter wherein a leading shutter blind and a trailing shutter blind are driven in accordance with the output of a light measuring circuit which measures the scene brightness. A main switch S is connected with a power source E, and an oscillator 1 is connected across the power source E by way of the main switch S. The oscillator 1 is well known in the art and accordingly the structural details thereof are omitted here. The oscillator 1 has a pair of input terminals 1a connected with said power source E and the main switch S and a pair of output terminals 1b. Across the output terminals 1b are connected a first capacitor 10 by way of a first diode 11 and a second capacitor 20 by way of a second diode 21 in parallel with each other.

The first capacitor 10 is connected at the connecting point 10a between the first capacitor 10 and the first diode 11 with a terminal 17b of a first set of output terminals 17a and 17b by way of second switch 12. A first thyristor 13 and a first coil 14 are connected in series with the first set of output terminals 17a and 17b. The second switch 12 is closed upon depression of a shutter release button (not shown). The first thyristor 13 is connected at the gate 13a thereof with an RC time constant circuit 15 which is connected with said main switch S by way of a first switch 2 which in turn is closed upon depression of the shutter release button together with said second switch 12, so that the first thyristor 13 is turned ON when a time determined by the RC time constant circuit 15 has lapsed after the time constant circuit 15 is started.

The second capacitor 20 is connected at the connecting point 20a between the second capacitor 20 and the second diode 21 with a terminal 27b of a second set of output terminals 27a and 27b by way of a third switch 22. A second thyristor 23 and a second coil 24 are connected in series with the second set of output terminals 27a and 27b. The third switch 22 is closed upon depression of the shutter release button together with said first and second switches 2 and 12. The gate 23a of the second thyristor 23 is connected with the emitter 25a of a transistor 25 so that the second thyristor 23 is turned ON when an emitter current flows through the transistor 25.

A light measuring circuit 26 comprising a photodetector P and a capacitor C connected in series is connected between said first switch 2 and the power source E. The connecting point 26a between the photodetector P and the capacitor C is connected with the base 25b of said transistor 25. When a time determined by the light measuring circuit 26 in accordance with the scene brightness measured by the photodetector P has lapsed after the first switch 2 is closed, the base 25b of the transistor 25 is supplied with a base current and accordingly the emitter current flows through the transistor 25 to turn ON said second thyristor 23.

In operation of the above described power source circuit in accordance with the present invention, the main switch S is first closed to prepare for the shutter operation. By closing the main switch S, the oscillator 1 is turned ON to generate an oscillating output. The oscillator 1 includes a transformer 1c and accordingly provides an stepped up output at the output terminals 1b thereof. The output of the oscillator 1 is rectified through the diodes 11 and 21 and charges the capacitors 10 and 20. Then, the first to third switches 2, 12 and 22 are closed upon depression of a shutter release button (not shown). Upon the depression of the shutter release button, the light measuring circuit 26 starts to measure the scene brightness. Simultaneously, the RC time constant circuit 15 is turned ON. Therefore, when a time determined by the RC time constant circuit 15 has lapsed, the first thyristor 13 is turned ON to energize the first coil 14. This time delay is provided to allow the various shutter mechanisms to prepare for the exposure. For instance, a swing mirror is moved up out of the light path from the taking lens of the camera during this time. By the energization of the first coil, a leading shutter blind is driven to open an aperture of the camera to start exposure of the film therein. Then, when a time determined by the light measuring circuit 26 has lapsed, the transistor 25 is turned ON to turn ON the second thyristor 23 and energize the second coil 24. The second coil 24 is connected with a trailing shutter blind and the trailing shutter blind is closed to terminate the exposure upon energization of the second coil 24.

The energization of the first and second coils 14 and 24 is conducted by the electric current discharged from the first and second capacitors 10 and 20, respectively. Since the capacitors 10 and 20 discharge in a short period, a large current can be obtained. When the first capacitor 10 is discharged upon closure of the second switch 12, the electric charge stored in the second capacitor 20 does not flow into the first coil 14 since the second diode 21 is connected between the second capacitor 20 and the second switch 12.

In the above described embodiment, two coils driven by two capacitors are employed. However, it will be noted that is possible to provide more than two coils driven by two or more capacitors. For instance, when three coils are employed, the first coil is used for swinging up a mirror and setting a diaphragm, the second coil is used for starting the leading shutter blind and the third coil is used for starting the trailing shutter blind. It will further be noted that the thyristors 13 and 23 can be replaced by an other kind of switching element. Further, the photodetector P can be of any type. The above embodiment is designed to use a cadmium sulfide photodetector. However, by modifying the light measuring circuit 26, it is possible to use a photovoltaic type photodetector such as a silicon blue cell.

Figure 2:
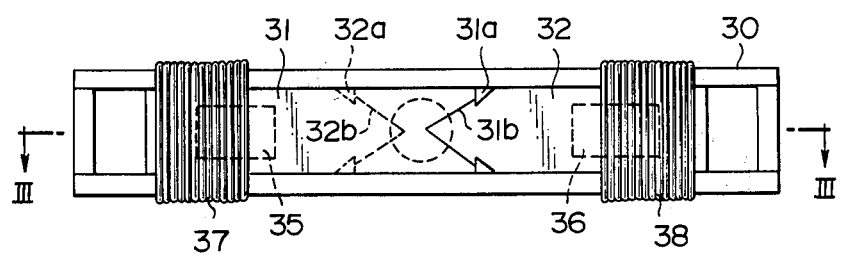
FIG. 2 is a front view of an example of an electromagnetically driven shutter which is driven by the power supply circuit in accordance with the present invention.
Figure 3:
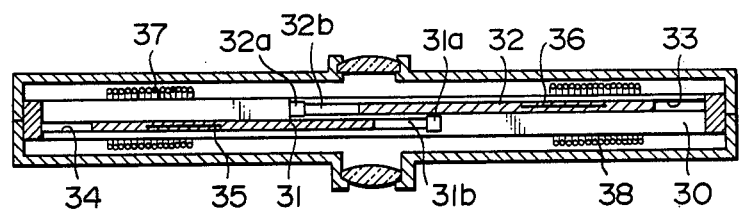
FIG. 3 is a longitudinal sectional view of the shutter as shown in FIG. 2.

An example of a shutter mechanism driven by the power source circuit in accordance with the present invention is illustrated in FIGS. 2 and 3. Referring to FIGS. 2 and 3, two shutter blades 31 and 32 are slidably mounted in a shutter frame 30 to be guided along two guide grooves 33 and 34, respectively. The two shutter blades 31 and 32 are held in abutment with stoppers 31a and 32a by means of a spring means (not shown) when the shutter is closed, as shown in FIG. 2. The first shutter blade 31 has sealed therein a permanent magnet 35 and the second shutter blade 32 has sealed therein a permanent magnet 36. A first coil 37 (corresponding to said first coil 14 in FIG. 1) is stationarily provided around the first shutter blade 31 and a second coil 38 (corresponding to said second coil 24 in FIG. 1) is stationarily provided around the second shutter blade 32. When the first coil 37 is energized, the first shutter blade 31 is moved to the left overcoming the force of the spring means by an electromagnetic force produced between the first coil 37 and the permanent magnet 35 carried in the first shutter blade 31. Similarly, when the second coil 38 is energized, the second shutter blade 32 is moved to the right. Thus, by energizing the coils 37 and 38, the shutter blades 31 and 32 are slid in the direction to open a light passage to expose a film in the camera. After the shutter is opened, the shutter blades 31 and 32 are closed by the force of the spring means upon deenergization of the coils 37 and 38. The shutter speed is controlled by controlling the time during which the coils 37 and 38 are energized. This time is controlled by said light measuring circuit 26 of the circuit shown in FIG. 1. In the above embodiment, it is possible to control the length of stroke of the shutter blades by use of a step cam or the like located in the way of the movement of the shutter blades, whereby the size of an aperture formed by the cut-away portions 31b and 32b of the shutter blades 31 and 32 is controlled.

I claim:

1. An electric control circuit for use in a photographic camera comprising
   a shutter release member,
   a plurality of movable members disposed within said photographic camera,
   a plurality of electromagnetic coils respectively associated with said movable members,
   a DC power source,
   means for increasing the voltage level of said DC power source,
   a plurality of capacitors responsive to said voltage level increasing means and being charged by the voltage produced thereby,
   a plurality of controllable switching means respectively connected to said plurality of capacitors, said plurality of electromagnetic coils being respectively responsive to said plurality of controllable switching means,
   a plurality of timing circuits respectively connected to said plurality of controllable switching means for applying control signals thereto, each timing circuit having a timing period established thereby, first switching means for connecting said DC power source to said plurality of timing means to initiate the respective timing periods thereof, a plurality of further switching means for respectively connecting said plurality of capacitors to said plurality of controllable switching means, said first switching means and plurality of further switching means being responsive to the actuation of said shutter release member of said photographic camera to a. initiate said timing periods by connecting said DC power source to said plurality of timing means via said first switching means so that a first of said control signals is applied to a first of said controllable switching means after a first of said timing periods elapses and a second of said control signals is applied to a second of said controllable switching means after a second of said timing periods elapses, b. discharge a first of said capacitors through said first controllable switching means and its associated electromagnetic coil via a first of said further switching means in response to said first control signal being applied to said first controllable switching means so that upon the energization of said last-mentioned electromagnetic coil a first of said movable members of said photographic camera is moved, and c. discharge a second of said capacitors through said second controllable switching means and its associated electromagnetic coil via a second of said further switching means in response to said second control signal being applied to said second controllable switching means so that upon the energization of said last-mentioned electromagnetic coil a second of said movable members of said photographic camera is moved.

2. An electric control circuit as defined in claim 1 wherein the timing circuit connected to said second controllable switching means includes light sensitive means so that the timing period of said last-mentioned timing means varies in accordance with the light sensed by said light sensitive means.

3. An electric control circuit as in claim 2 where said first movable member is a leading shutter blind and said second movable member is a trailing shutter blind.

4. An electric control circuit as defined in claim 1 including a main switching means for connecting said DC power supply to said voltage level increasing means.

5. An electric control circuit as defined in claim 1 where said means for increasing the voltage level of said DC power source includes an oscillator responsive to said DC power source and a plurality of rectifying means connecting said oscillator respectively to said plurality of capacitors.

6. An electric control circuit as defined in claim 5 including a transformer connected between said oscillator and said rectifying means for stepping up the voltage from said oscillator.

* * * * *